United States Patent
Fahlbusch et al.

(10) Patent No.: US 12,169,269 B2
(45) Date of Patent: Dec. 17, 2024

(54) ADAPTER FOR AN OBJECTIVE LENS, DEVICE FOR SUPPORTING THE ADAPTER AND POSITIONING DEVICE

(71) Applicant: Carl Zeiss Microscopy GmbH, Jena (DE)

(72) Inventors: Ingo Fahlbusch, Goettingen (DE); Saskia Pergande, Jena (DE); Peter Schnuell, Gleichen (DE); Daniel Stegmann, Grossschwabhausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 942 days.

(21) Appl. No.: 15/733,686

(22) PCT Filed: Mar. 25, 2019

(86) PCT No.: PCT/EP2019/057389
§ 371 (c)(1),
(2) Date: Sep. 29, 2020

(87) PCT Pub. No.: WO2019/201558
PCT Pub. Date: Oct. 24, 2019

(65) Prior Publication Data
US 2021/0011267 A1    Jan. 14, 2021

(30) Foreign Application Priority Data
Apr. 18, 2018   (DE) .................... 10 2018 205 897.0

(51) Int. Cl.
*G02B 21/02*   (2006.01)
*G02B 21/36*   (2006.01)
*G02B 21/24*   (2006.01)

(52) U.S. Cl.
CPC ........... *G02B 21/02* (2013.01); *G02B 21/361* (2013.01); *G02B 21/248* (2013.01)

(58) Field of Classification Search
CPC .......................... G02B 21/00–368; G02B 7/14
See application file for complete search history.

(56) References Cited

U.S. PATENT DOCUMENTS

| | | | | |
|---|---|---|---|---|
| 5,198,927 A | * | 3/1993 | Rathbone | G02B 21/00 359/388 |
| 6,286,963 B1 | * | 9/2001 | Nelson | G02B 7/022 |
(Continued)

FOREIGN PATENT DOCUMENTS

| | | |
|---|---|---|
| CN | 101874220 | 10/2010 |
| DE | 1 547 374 | 12/1969 |
(Continued)

OTHER PUBLICATIONS

Chinese Office Action dated Aug. 8, 2022, in Chinese Application No. 201980026761.5, with English translation, 16 pages.
(Continued)

*Primary Examiner* — Christopher Stanford
(74) *Attorney, Agent, or Firm* — Grüneberg and Myers PLLC

(57) ABSTRACT

An adapter that can connect to an objective has a receiving area for receiving the objective. The adapter has holding structures which extend essentially in a plane directed transversely to the objective axis of the objective and which are designed to engage corresponding structural elements of an adapter receptacle while the adapter is being inserted into the adapter receptacle, thereby preventing the adapter from already moving in the direction of the objective axis while the adapter is being inserted into the adapter receptacle. A device for holding an adapter, can include an adapter receptacle for receiving the adapter and an adapter and also for moving an optical element into the objective axis. An adjusting device can include the adapter and the adapter receptacle.

12 Claims, 21 Drawing Sheets

(56) References Cited

U.S. PATENT DOCUMENTS

| | | | | |
|---|---|---|---|---|
| 7,796,352 B2 * | 9/2010 | Teich | ............... | G02B 7/021 |
| | | | | 359/830 |
| 8,730,583 B2 * | 5/2014 | Schek | ............ | G02B 27/0068 |
| | | | | 359/659 |
| 9,383,567 B2 * | 7/2016 | Ue | ................ | G02B 21/06 |
| 2008/0186602 A1 | 8/2008 | Teich et al. | | |
| 2010/0309573 A1 | 12/2010 | Mitzkus et al. | | |
| 2012/0062987 A1 * | 3/2012 | Hnatkovich | ......... | G02B 21/16 |
| | | | | 359/385 |
| 2013/0016963 A1 * | 1/2013 | Miller | ............ | G02B 21/362 |
| | | | | 396/428 |
| 2017/0031125 A1 * | 2/2017 | Lee | ............... | G02B 26/008 |

FOREIGN PATENT DOCUMENTS

| | | | | | |
|---|---|---|---|---|---|
| DE | 10 2006 024 109 | | 11/2007 | | |
| DE | 10 2007 057 436 | | 6/2009 | | |
| JP | H06308404 A | * | 11/1994 | | |
| JP | H09113792 A | * | 5/1997 | | |
| JP | 2001033705 A | * | 2/2001 | | |
| JP | 2001091841 A | * | 4/2001 | | |
| WO | WO-2012097191 A2 | * | 7/2012 | ......... | G02B 21/0052 |

OTHER PUBLICATIONS

International Search Report issued Jun. 14, 2019 in PCT/EP2019/057389 with English Translation, 5 pages.
Written Opinion issued Jun. 14, 2019 in PCT/EP2019/057389 with English Translation, 7 pages.
Search Report issued Jan. 22, 2019 in German Application No. 10 2018 205 897.0, 8 pages.
International Preliminary Report on Patentability issued Oct. 20, 2020 and English translation of Written Opinion of the International Searching Authority issued Jun. 14, 2019 in PCT/EP2019/057389.

* cited by examiner

ADAPTER FOR AN OBJECTIVE LENS, DEVICE FOR SUPPORTING THE ADAPTER AND POSITIONING DEVICE

This application is the National Stage entry under § 371 of International Application No. PCT/EP2019/057389, filed on Mar. 25, 2019, and which claims the benefit of German Application No. 10 2018 205 897.0, filed on Apr. 18, 2018. The contents of each of these applications are incorporated herein by reference in their entireties.

BACKGROUND OF THE INVENTION

Field of the Invention

The invention relates to an adapter for a microscope system. The invention also relates to a device for holding an adapter and to an adjusting device.

Description of Background Art

Many modern microscopy methods require highly precise positioning of the microscope objectives used in each case for image capture. For example, during the recording of stacks of individual images lying one behind the other in the direction of an optical axis of the microscope system (image stacks, z-stacks), an objective used for the image recording must be able to be moved highly dynamically and with high precision. In order to be able to carry out the microscopy process on a sample with different magnifications and resolutions, it is also necessary to switch between different objectives.

The objectives held in front of a microscope are usually arranged and held in a carrier such as a nosepiece. For this purpose, the objectives may be connected to standardized adapters so that, despite their different dimensions, objectives can be used as desired in a respective system for storing, transferring and using the objectives. An objective that is currently being used or is intended for image recording is in a working position while the other objectives held in the nosepiece are swiveled out of the working position.

The adapters can only be used for one type of carrier. Their possibilities for use are therefore limited and, in particular, not suitable for both upright and inverted arrangements of the adapter.

BRIEF SUMMARY OF THE INVENTION

The invention is based on the object of proposing a further possibility of designing an adapter which allows use in different carriers and arrangements.

The object is achieved by an adapter for an objective, a device for holding the adapter and an adjusting device for moving an optical element into the objective axis of the objective. Advantageous further developments are the subject of preferred embodiments.

DETAILED DESCRIPTION OF THE INVENTION

Figure 1:
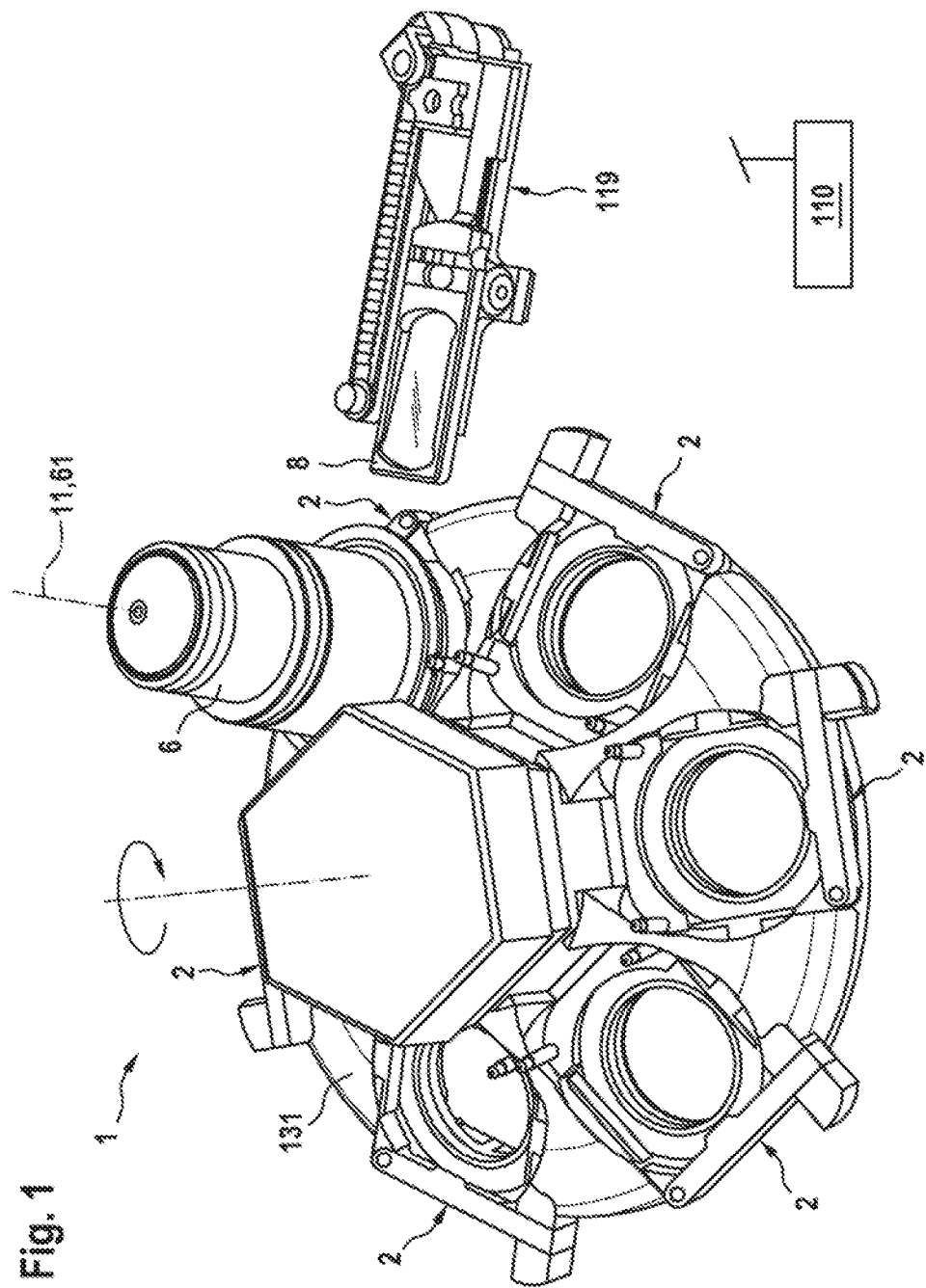
FIG. 1 shows a schematic representation of a first exemplary embodiment of an adjusting device according to the invention with a carrier in a perspective view.

The adapter is designed for connection to an objective and for this purpose has a receiving area for receiving the objective. The objective has an objective axis.

The adapter is characterized by holding structures which extend essentially in a plane directed transversely to the objective axis of the objective and which are designed to engage corresponding structural elements of an adapter receptacle while the adapter is being inserted into the adapter receptacle. The joint action of the holding structures and the structural elements prevents the adapter from already moving in the direction of the objective axis of the objective while the adapter is being inserted into the adapter receptacle.

The holding structures and the structural elements corresponding to them allow the adapter to be used in both upright and inverted arrangements. These advantageous possibilities for use are achieved in particular in a combination with a device according to the invention for holding the adapter, which is described in more detail further below.

The adapter is advantageously provided with a receiving area by means of which a releasable connection to an objective can be established. Such a releasable connection can be realized for example by means of matching threads of the receiving area and the objective or in the form of a bayonet closure between the two.

The adapter encloses a free passage through which a beam path can be directed, along which radiation that can be detected and/or emitted by means of the objective, for example an illuminating radiation or a detection radiation, can propagate.

The holding structures can be designed in each case as an opening, groove, pin or projection and are located, for example, on a base of the adapter facing away from the receiving area. An adapter can have several and different holding structures. Openings functioning as holding structures can be through holes or blind holes. The openings may have any cross section. In a technologically simple and inexpensive simple exemplary embodiment, the openings are bores.

The adapter has a collar to rest on the adapter receptacle. Moreover, it has protrusions and/or indentations, which correspond to correspondingly formed guides of the adapter receptacle. Flattenings of the outer circumference of the adapter can also be understood as constituting indentations of the adapter. For example, one or more lateral flattening(s) may be present on the adapter and lateral guiding surfaces on the adapter receptacle. The projections and/or indentations and the corresponding guiding surfaces have the effect that the alignment of the adapter is maintained during the insertion into the adapter receptacle. At least one of the protrusions and/or indentations of the adapter may have a contact surface. The contact surface serves for being guided against an adjusting surface of the adapter receptacle, whereby the adapter is moved into a target position with respect to the adapter receptacle.

In a further possible embodiment, the adapter may have a slot for receiving an optical element that can be moved into the objective axis. The slot is preferably located in the base of the adapter.

In one possible embodiment of the invention, the optical element is a DIC slider (DIC=differential interference contrast), a filter. The optical element is explained in more detail below using the example of a DIC slider.

Depending on the design of the slot, it may be closed, that is to say encompassed by material of the adapter along its circumference. Alternatively, in further embodiments, the slot is only closed over parts of its circumference and may for example only be closed by the objective inserted into the receiving area.

At least one magnet may be arranged in the slot. This can produce a magnetic force effect with the material of an optical element pushed into the slot and/or with a magnet of the optical element. Such a force effect serves for example for holding and positioning the optical element pushed into the slot. The magnet arranged in the slot may be a permanent magnet or a controlled, switchable electromagnet.

It is also possible for a damping element to be arranged in the slot and/or on the optical element. If the optical element is pushed into the slot, an unintentionally hard stop of the optical element on the adapter can be avoided or mitigated by the damping element. The damping element consists for example of cellular rubber, foam rubber and/or a closed-pore elastomer.

Each adapter or objective may be assigned its own optical element that remains on the respective adapter. The optical element may be permanently connected to the adapter and remain on the adapter regardless of its current state of use. It is also possible that the optical element can be pushed into the slot of the respective adapter and completely removed from the slot. For the purposes of this description, a completely removable optical element is not permanently connected to the adapter.

In further embodiments, the adapter may have transporting openings. Transporting elements can engage therein. With the transporting elements, the adapter can be inserted into or removed from an adapter receptacle described further below. The adapter may also optionally be transported by means of the transporting elements between a magazine and the adapter receptacle.

The transporting openings may be provided with magnets in order by the action of a magnetic holding force between the magnet and the transporting element to releasably connect the two to one another.

On the adapter there may also be at least one magnet, which in interaction with the adapter receptacle produces a magnetic holding force. This holding force supports a desired orientation and secure holding of the adapter in the adapter receptacle and can for example prevent the adapter from falling out of the adapter receptacle as long as the adapter receptacle is not closed (see also the following description).

A device according to the invention for holding the adapter comprises an adapter receptacle for receiving the adapter. Also formed is at least one adjusting surface of the adapter receptacle, against which a contact surface of the adapter can be guided and can be brought into contact with it in a target position. If the contact surfaces and the respective adjusting surfaces are in contact with one another, the adapter is in a target position with respect to the adapter receptacle. If the adapter receptacle is for example arranged in or on a carrier of the microscope system, for example a nosepiece, then the adapter is also in a target position with respect to the microscope system. Depending on the current position of the carrier, the objective axis of the adapter located in the target position can coincide with the beam path of the microscope system, that is to say with its optical axis.

Furthermore, there are structural elements of the adapter receptacle, which correspond to the holding structures of the adapter extending in a plane directed transversely to the objective axis. While the adapter is being inserted into the adapter receptacle, the holding structures come into engagement with the structural elements, so that the adapter is prevented from already moving in the direction of the objective axis of the objective while the adapter is being inserted into the adapter receptacle. The adapter receptacle is provided with a pivotable or insertable bar, by the action of which the inserted adapter is kept in the target position.

The reproducibility of the target position is achieved by way of the contact surfaces and adjusting surfaces. By way of example, these form a three-point support or a three-point contact. For example, such a positioning can be realized by means of a dovetail element adjusted in relation to the optical axis of the microscope system and by clamping the contact surfaces and adjusting surfaces against each other by means of the bar.

In order to achieve three-point clamping, the base of the adapter may be conically shaped, for example as a dovetail ring, and designed as accordingly interrupted in subsegments. Only two of the subsegments are in engagement as contact surfaces with the respective adjusting surfaces and define contact points. A third contact point can be realized by way of a spring element in the bar, which acts as an adjusting surface and is guided against another contact surface of the adapter.

Instead of a dovetail ring, on the bottom of the adapter there may also be for example three balls, which protrude slightly downward and laterally from the adapter. Thus, on the one hand, a three-point support on a surface of the adapter receptacle and, at the same time, a three-point contact in the lateral direction on the adapter receptacle can be realized.

In a further possible embodiment of the adapter receptacle according to the invention, the adjusting surfaces are designed as inclined surfaces, for example in the form of lying V-grooves. The adjusting surfaces may be distributed at 120° to one another.

The device is described below together with an adapter according to the invention. In the following it is assumed that the adapter is connected to an objective. From the point of view of the purely mechanical requirements of the invention, the operations of inserting the adapter into the adapter receptacle could also be carried out with the adapter alone.

The bar may be articulated on the adapter receptacle, in particular on a base plate of the adapter receptacle, and be pivotable about an axis of rotation. Alternatively, the bar may be designed such that it can be fitted onto the adapter receptacle or can be inserted into it. The bar may advantageously be locked on the adapter receptacle by means of a closure. The adapter located at the target position is prevented from moving transversely to the objective axis by the action of the bar.

In one possible embodiment, the closure of the bar may have at least one magnet. Magnetic holding forces may serve for keeping the bar in a desired position. For example, the bar can be prevented from unintentionally striking or falling off even in the unclosed state by magnetic holding forces. The magnet may be a permanent magnet or a controlled, switchable electromagnet.

Attached to the bar there may be a pressure piece, which in a closed state of the bar is guided against the adapter without play. The pressure piece may in particular be resilient or elastic and thus bridge and compensate for any gaps that may exist between the bar and the adapter. The pressure piece may have or represent one of the adjusting surfaces.

It is also possible for the bar, in particular the closure, to have an access area, on which for example an automated actuating unit can act and actuate the bar. The closure may thus have an opening in the sense of a keyhole. This keyhole can be detected automatically. An actuating element that is compatible with this and by means of which the closure is actuated can be inserted into the detected keyhole.

In a further developed embodiment, the device according to the invention may be designed for supplying a medium to the adapter, and possibly to the objective, and/or for discharging a medium therefrom.

For this purpose, in one possible embodiment the device is characterized by a first channel of the adapter receptacle and a second channel of the adapter. In each case an opening of the first channel and of the second channel are in contact with one another when the adapter is in the target position, so that a medium can be passed through the channels that are connected in this way. Such media may be liquid, gaseous or mixtures thereof, for example aerosols.

The medium supplied or discharged may serve for example for immersing a front lens of the objective and/or for controlling the temperature of the objective. For this purpose, the objective may likewise have at least one channel as a media line.

One advantage of such an embodiment is that the supply and discharge of the medium does not have to be attached to a rotatable nosepiece and it is possible to dispense with an expensive rotary feedthrough for the media lines to the rotating nosepiece.

The channels may be designed as bores, sealed grooves, tubes and/or hoses. In order for example to supply a front lens of the objective with immersion medium if necessary or to remove it again, a groove or a bore in the mount of the front lens may extend up to the front lens and open out there. In a further possible embodiment, the front lens may have a corresponding groove if this does not impair the optical beam path.

The channel opening out at the front lens may have a nozzle at its end, the effect of which is to distribute the medium on the front lens.

One advantage of using a hose or pipeline is that it can be replaced when it become dirty or old.

In further embodiments, there may be a greater number of channels through which a medium or several media can be transported.

Furthermore, the interface between the adapter and adapter receptacle may be designed with electrical contact elements, for example for detecting an objective, for objectives with integrated illumination, for objectives with an integrated camera (overview objective) or for motor-driven objectives. For example, in the adapter receptacle there may be contact elements in the form of contact pins and/or contact surfaces, which come into electrically conductive connection with contact elements of the adapter when the adapter has been brought into the target position. Contact elements may be designed as electrically conductive pins, surfaces and/or as foil cables, that is to say flexible electrical conductors attached or connected to a flexible base.

The adapter receptacle may be attached to a carrier such as a nosepiece, a strip magazine, a chain magazine, a conveyor belt or the like. If there are several adapter receptacles, an adapter can advantageously be optionally connected to one of the adapter receptacles.

Each adapter receptacle may be designed as an independent component. If there are a number of mounting locations on the carrier for the optional mounting of one adapter receptacle in each case, a required number of adapter receptacles can be mounted on the carrier if necessary. In addition, they can be individually replaced when worn.

The device according to the invention comprising the adapter receptacle with the adapter may be equipped with an adjusting device for moving an optical element into the objective axis. The adjusting device in this case comprises the adapter receptacle, the adapter and a driver. The driver has a slider for coupling to the optical element. The slider is provided with at least one magnet or a mechanical coupling mechanism, by means of which a releasable holding force can be generated between the slider and the optical element. The slider may be motor-driven and controllable. In further possible embodiments, it may also be designed to be manually movable into or out of the beam path of the microscope system.

The adjusting device may have on its driver a stripper, which can be moved against the optical element as a result of an adjusting movement of the slider and, by its action, the releasable holding force is overcome when there is a continued adjusting movement of the slider. The stripper thus serves for separating the optical element from the slider. This may be necessary if the optical element remains on the adapter when the adapter is changed. In further embodiments, a separation of the slider and the optical element may be brought about by moving the carrier essentially transversely to a direction of movement of the slider.

For positioning or removing the optical element from the beam path of the active objective, for example a slider with a magnet moves up to the coupling point of the optical element and docks on it. Alternatively, a different coupling mechanism may also be used between the slider and the optical element, for example resilient elements, electrically switchable magnets or mechanically acting coupling mechanisms. After the optical element has been returned to the adapter slot, the coupling must be released again. In the case of permanent magnets, the stripper is required to counteract the holding force of the magnetic coupling between the optical element and the magnet on the slider by keeping the optical element in its position in the slot while the slider moves back again.

The device according to the invention can be used in the entire field of microscopy with a wide variety of objectives, starting with wide-field and confocal microscopes up to light-sheet microscopy, but also with a white-light interferometer.

The invention is explained in more detail below on the basis of exemplary embodiments and figures.

The representations of the exemplary embodiments are shown by way of example and are schematic. Unless otherwise specifically stated, the same reference signs denote the same technical elements.

Shown in FIG. 1 is an overview of a carrier 131, on which a number of adapter receptacles 2 are arranged. The carrier 131 is part of a microscope system 1 not shown any more specifically, with an optical axis 11. Held in one of the adapter receptacles 2 is an adapter 7 (see for example FIG. 2) with an objective 6, the objective axis 61 of which coincides with the optical axis 11 of the microscope system 1. In the adapter 7 there is a slot 74 (see for example FIGS. 2 and 4) into which an optical element 8 can be inserted. In the inserted state, the optical element 8 is located in the objective axis 61 and, in the case shown in FIG. 1, also in the optical axis 11 of the microscope system 1. The optical element 8 has been completely removed from the slot 74 of the adapter 7 by means of a driver 119. The carrier 131 can be rotated in a controlled manner about an indicated axis of rotation, so that a selected adapter receptacle 2 can be moved into the optical axis 11 as a result of corresponding control commands from a control unit 110.

Figure 2:
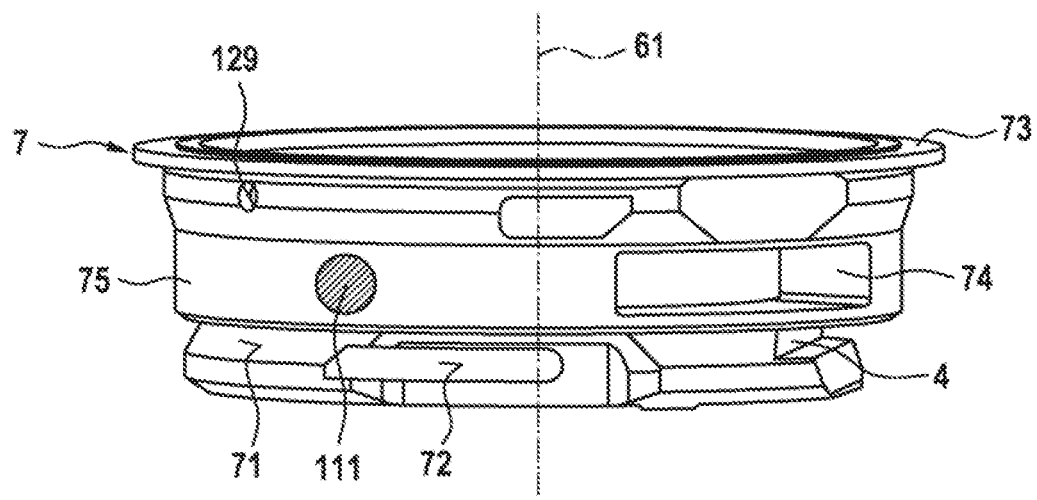
FIG. 2 shows a schematic representation of a first exemplary embodiment of an adapter according to the invention in a side view.

An adapter 7 according to the invention is shown by way of example in FIG. 2. The adapter 7 has a collar 73, which has upper and lower planar bearing surfaces. In a base 75 of the adapter 7 there is the slot 74 in which the optical element 8 (see FIGS. 1 and 19 to 26) can be inserted and held transversely to the objective axis 61. The objective axis 61 is determined by the optical axis of an objective 6 connected to the adapter 7, as is shown for example in FIGS. 1, 19 and 20. On the base 75 of the adapter 7 there are contact surfaces 71 and guiding surfaces 72. The contact surfaces 71 serve for ensuring a desired target positioning when they are in contact with corresponding adjusting surfaces 21 of an adapter receptacle 2 (see for example FIGS. 9 and 13). Optionally inserted in the base 75 are centering pins 129, by means of which an objective 6 received in the adapter 7 can be adjusted with respect to an alignment.

On the base 75 of the adapter 7 there are holding structures 4 in the form of grooves or projections. These run essentially transversely to the objective axis 61.

In order to secure the adapter 7 in the adapter receptacle 2 against falling out, at least one magnet 111 may optionally be embedded in the base 75 of the adapter 7. If correspondingly arranged areas of the adapter receptacle 2 are likewise magnetic and/or consist of a ferromagnetic material, the adapter 7 is held in the adapter receptacle 2 by a magnetic holding force.

Figure 3:
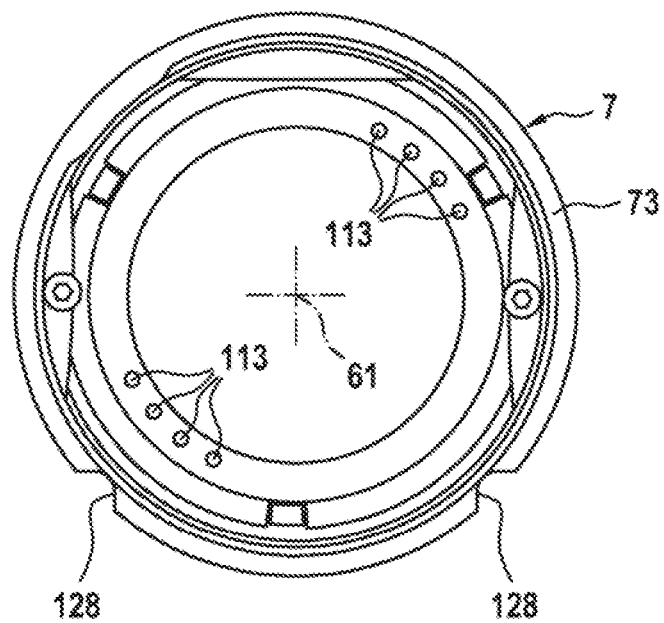
FIG. 3 shows a schematic representation of the first exemplary embodiment of the adapter according to the invention in plan view.

In FIG. 3, contact elements 113 on a peripheral board, which serve for making electrical contact with the adapter 7, can be seen in a plan view of an adapter 7 according to the invention. In addition, in the circumference of the collar 73 there are two indentations 128, into which corresponding bolts 112 of an adapter receptacle 2 (see FIGS. 9 to 12) can engage, thus ensuring that the adapter 7 is received the right way round in the adapter receptacle 2.

Figure 4:
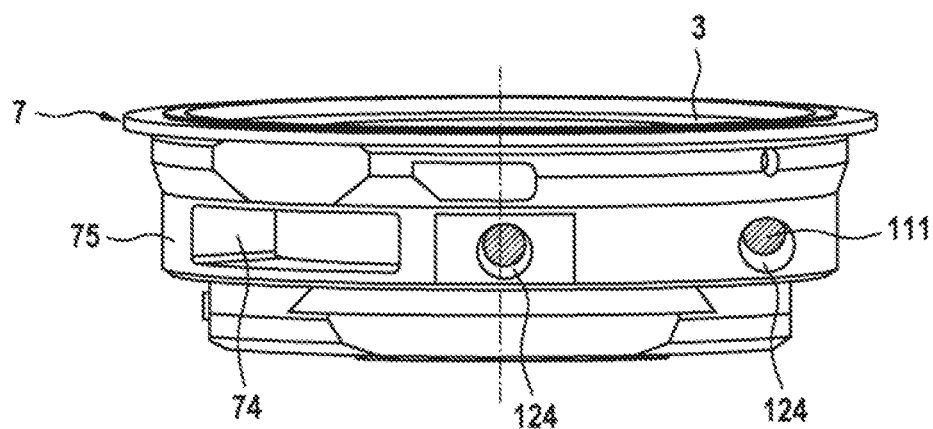
FIG. 4 shows a schematic representation of a second exemplary embodiment of an adapter according to the invention in a side view.

Shown in FIG. 4 is a receiving area 3 of the adapter 7, which is designed for connecting the adapter 7 to an objective 6. The connection may be made for example by means of a bayonet closure or a thread.

In addition, in the base 75 there are transporting openings 124, in which magnets 111 are optionally inserted. Transporting elements (not shown), for example arms of a pick-and-place machine, can engage in these transporting openings 124 in the manner of a forklift truck and transport the adapter 7 alone or together with the objective 6. The magnets 111 in the transporting openings 124 thereby fix the adapter 7 on the transporting elements. With the aid of a stripper (not shown) on the transporting elements, the adapter 7 can be separated from them and transferred for example to a magazine or to a carrier 131 (see FIGS. 1 and 21).

Figure 5:
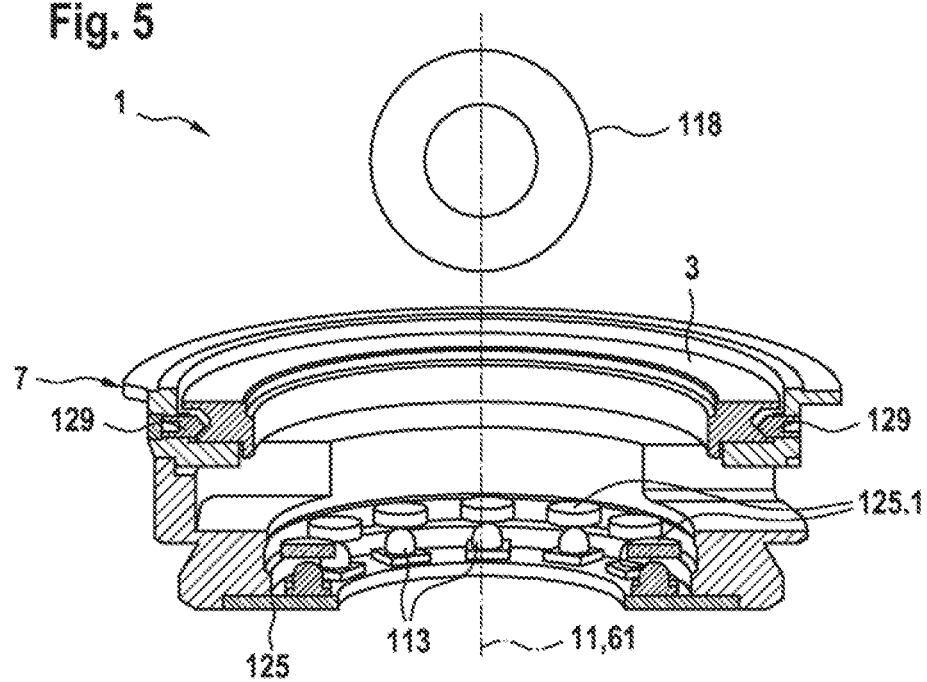
FIG. 5 shows a schematic representation of a third exemplary embodiment of an adapter according to the invention in a side view.

In a further possible embodiment of the adapter 7, there is also an illumination unit 125 (FIG. 5). Contact elements 113 of a board are in contact with lights 125.1. The illumination unit 125 shown schematically in FIG. 5 allows the known dark field application without passing the dark field channel through a microscope stand. The illumination is guided through the objective 6 and reflected into the object field by a toric mirror 118 of the microscope system 1 that is only shown symbolically. It is thus possible to use conventional dark field objectives with this adapter 7.

The adapter 7 is intended to be used together with an adapter receptacle 2 for the acquisition of image data, in particular by means of a microscope system 1.

Figure 6:
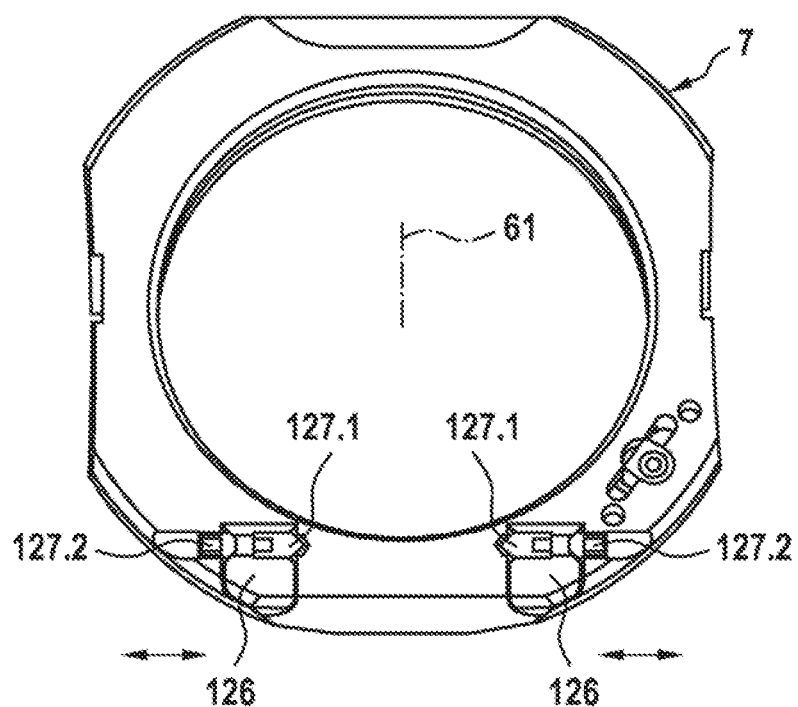
FIG. 6 shows a schematic representation of a fourth exemplary embodiment of an adapter according to the invention with adjustable fitting pieces.

In order to adjust the objective axis 61 of the adapter 7 inserted into the adapter receptacle 2 with an objective 6 to the optical axis 11 of the microscope system 1 (for example FIGS. 5, 19 and 20), two adjustable fitting pieces 126 may be integrated in the adapter 7 (FIG. 6).

By means of the two threaded pins 127.1 and 127.2 each shown in FIG. 6, the fitting pieces 126 can in each case be adjusted in the directions indicated by double-headed arrows and then fixed. The fitting pieces 126 can only be adjusted in one degree of freedom. Each of the fitting pieces 126 is moved with the aid of the respective threaded pin 127.1, the adapter 7 in the adapter receptacle 2 likewise being correspondingly moved. The objective axis 61 can thus be adjusted to the optical axis 11 of the microscope system 1. With the help of the second threaded pin 127.2 in each case, the adjusted positions of the fitting pieces 126 are fixed, i.e. arrested.

Figure 7:
FIG. 7 shows a schematic representation of a fifth exemplary embodiment of an adapter according to the invention without a slot and with a threaded ring in a side view.

In further embodiments, the adapter 7 according to the invention can be designed without a slot 74. In FIG. 7 the adapter 7 is provided with a centerable threaded insert 5, which serves as a receiving area 3. An adjustment of the threaded insert 5 is possible for example by means of tuning rings. Schematically shown in FIG. 7 is a contact element 113 in the form of a contact pin, which is looped through the adapter 7, and thus allows electrical signals to be conducted for example from an adapter receptacle 2 to the objective 6.

Figure 8:
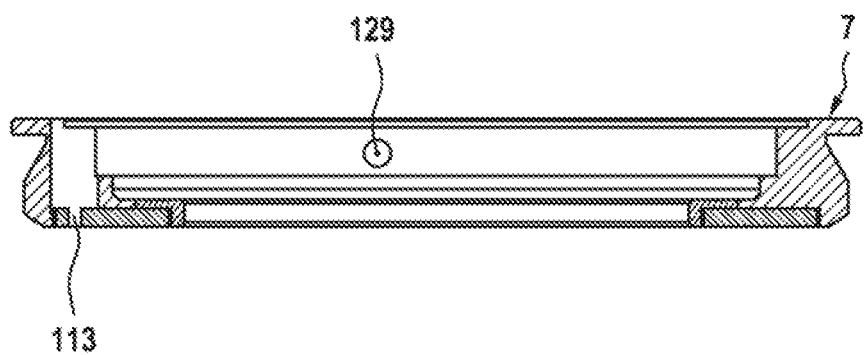
FIG. 8 shows a schematic representation of a fifth exemplary embodiment of an adapter according to the invention without a slot and without a threaded ring in a side view.

In other embodiments, the centerable threaded insert 5 can be omitted (FIG. 8). An objective 6 (not shown) can then be inserted into the adapter 7 with the correct orientation, centered by means of the centering pins 129 and fixed. Electrical contact can be made by means of a contact element 113, which is guided through the adapter 7 and is designed for example as a foil cable. In comparison, the use of a threaded insert 5 requires a larger installation space. For example, for ten contacts ten ring tracks are required, which would require the adapter 7 to have a larger diameter.

Figure 9:
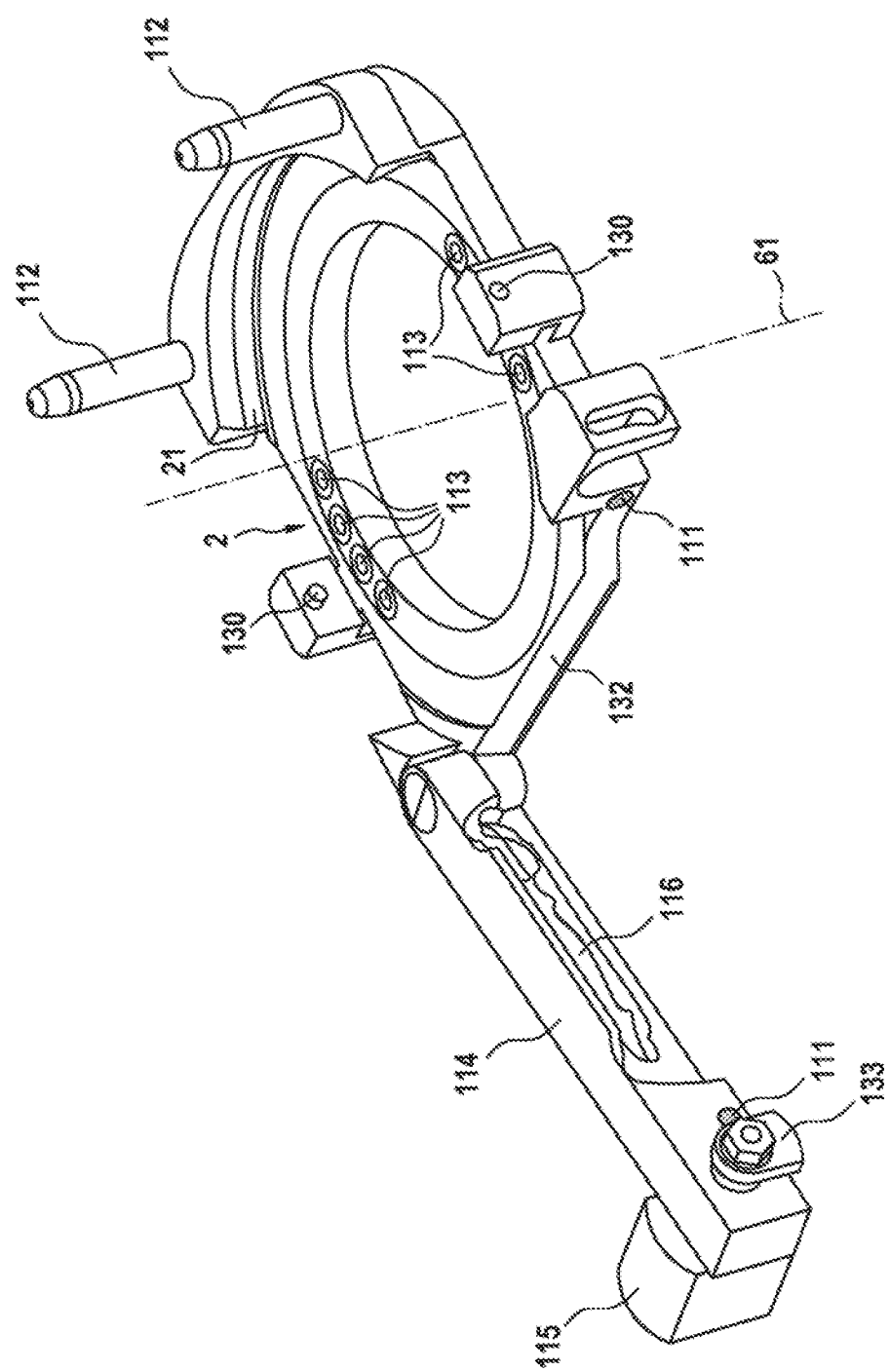
FIG. 9 shows a schematic representation of a first exemplary embodiment of an adapter receptacle according to the invention in a perspective view, inverted arrangement.

A first exemplary embodiment of an adapter receptacle 2 shown in FIG. 9 has a base plate 132 with a central opening and at least one adjusting surface 21. In addition, there are structural elements 130 in the form of two pins which protrude transversely to the objective axis 61 over the base plate 132. The structural elements 130 serve for engaging in the holding structures 4 of an adapter 7 to be inserted into the adapter receptacle 2 already during the insertion process and stopping the adapter 7 from moving in the direction of the objective axis 61. Shown is a so-called inverted arrangement, in which an adapter 7 to be used stands on the base plate 132 (see also FIGS. 19, 20 and 21).

The base plate 132 is also provided with contact elements 113, which correspond to contact elements 113 of the adapter 7 and allow a data flow and/or a supply of energy between the adapter receptacle 2 and the adapter 7 or objective 6.

A pivotable bar 114 is articulated on the base plate 132. In the closed state, this serves for holding an inserted adapter 7 in the adapter receptacle 2 and for guiding the adapter 7 with its contact surfaces 71 against the adjusting surfaces 21 and keeping it there in a target position. Bolts 112 standing on the base plate 132 serve for positioning the adapter 7 in the correct position.

The bar 114 is provided with a closure comprising a closure button 115 and a closure element 133 in the form of a swivel bar. On the base plate 132 and on the bar 114 there are magnets 111, which are of opposite polarities. The magnets 111 facing each other when the bar 114 is closed also keep the bar 114 in a closed position when the closure element 133 is moved into an "open" position. The magnetic holding force can be overcome for example by a user by pivoting the bar 114. The bar 114 has a recess with a pressure piece 116 in the form of a spring. The recess engages over a contact surface 71 of the inserted adapter 7 while the pressure piece 116 applies a force to the adapter 7 and, when the bar 114 is closed, brings it into the target position and keeps it there.

Figure 10:
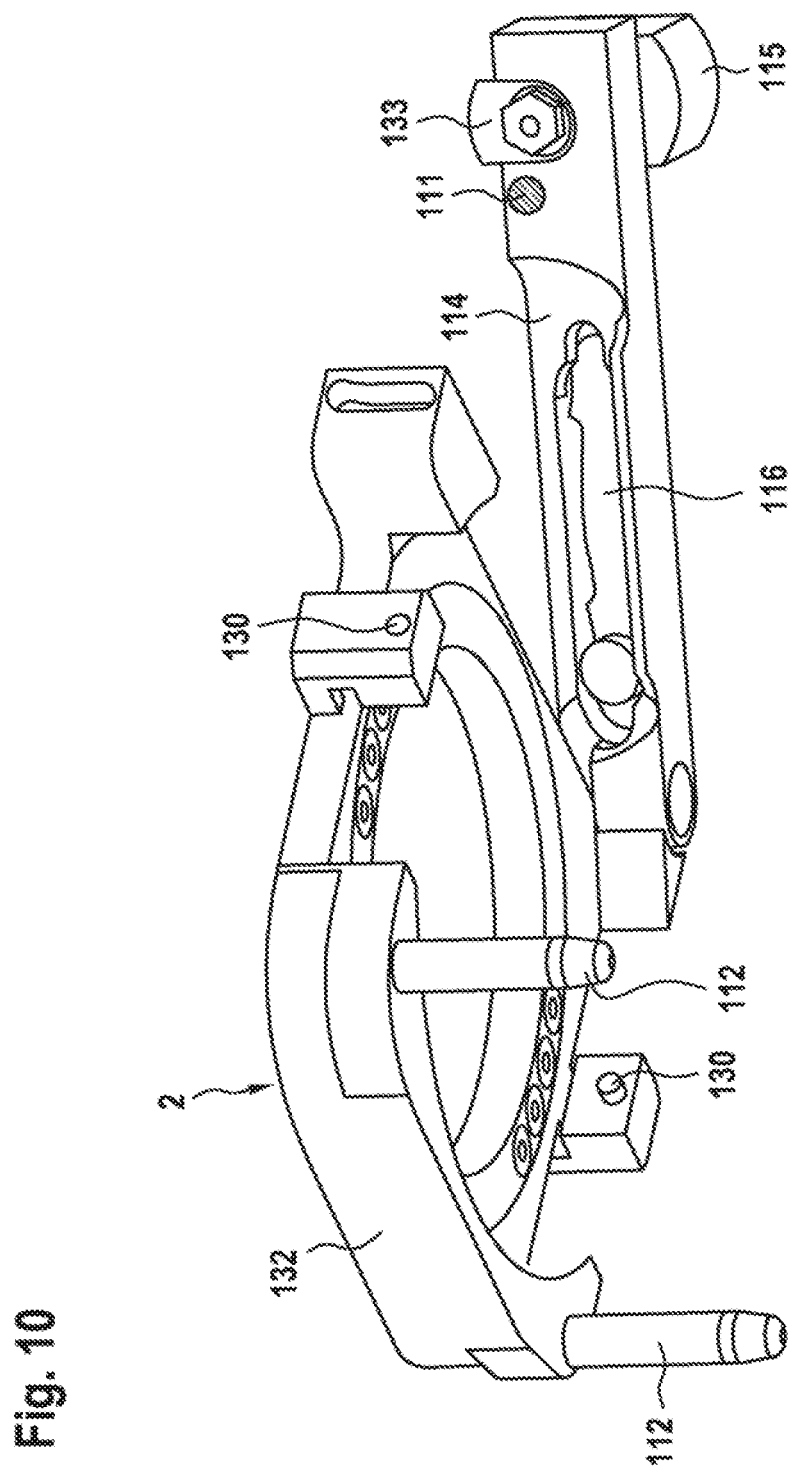
FIG. 10 shows a schematic representation of a second exemplary embodiment of an adapter receptacle according to the invention in a perspective view, upright arrangement.

FIG. 10 shows an exemplary embodiment of the adapter receptacle 2, which is basically designed in the same way as the embodiment described with respect to FIG. 9. The adapter receptacle 2 allows an adapter 7 to be inserted also in a so-called upright arrangement, in which an inserted adapter 7 hangs in the adapter receptacle 2. In this case, the adapter 7 is again secured against falling out during insertion by the interaction of holding structures 4 and structural elements 130. The adapter 7 is kept in the target position by the interengaging contact surfaces 71 and adjusting surfaces 21 and the bar 114, which likewise engages over one of the contact surfaces 71.

Figure 11:
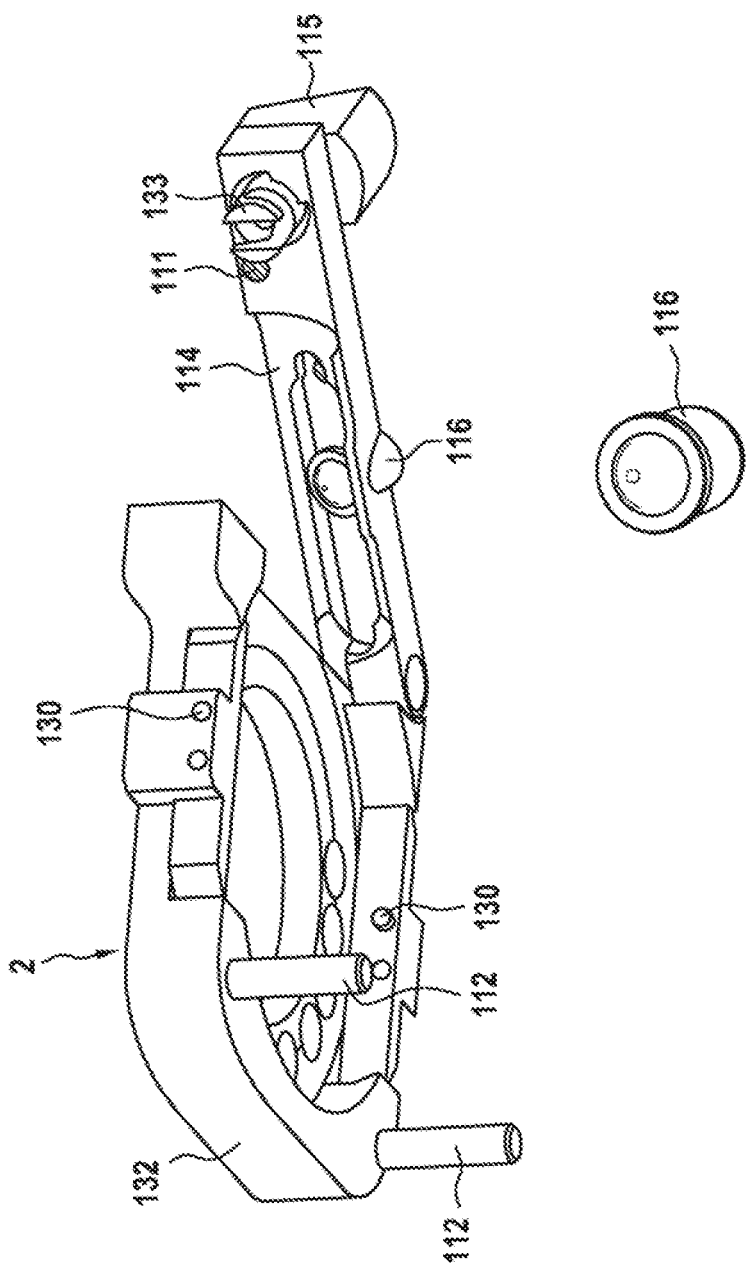
FIG. 11 shows a schematic representation of a third exemplary embodiment of an adapter receptacle according to the invention in a perspective view, upright arrangement.

In a further exemplary embodiment, the closure element 133 is designed as a bayonet closure. The pressure piece 116 is realized in the form of a spring-loaded ball (FIG. 11).

Figure 12:
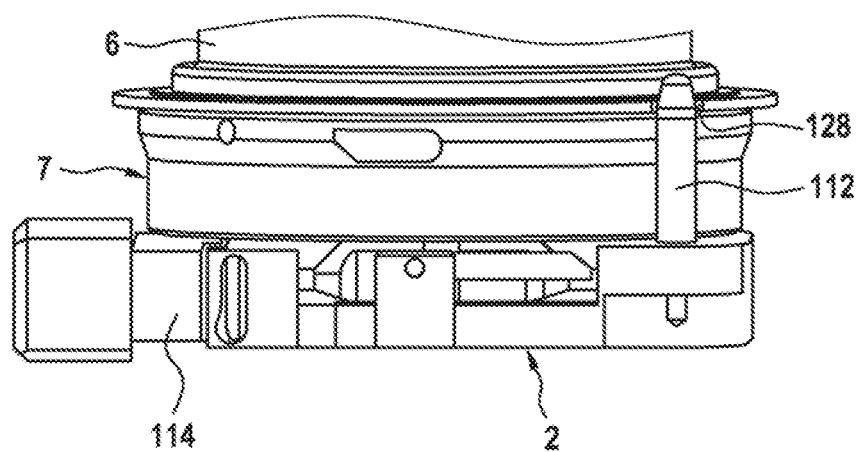
FIG. 12 shows a schematic representation of a first exemplary embodiment of a device according to the invention with an adapter, an objective and an adapter receptacle.

Shown by way of example in FIG. 12 is an adapter receptacle 2 with a closed bar 114 and an adapter 7 with an objective 6 (only partially visible) in the target position. The bolts 112 are engaged in the indentations 128 of the collar 73 (see FIG. 3).

Figure 13:
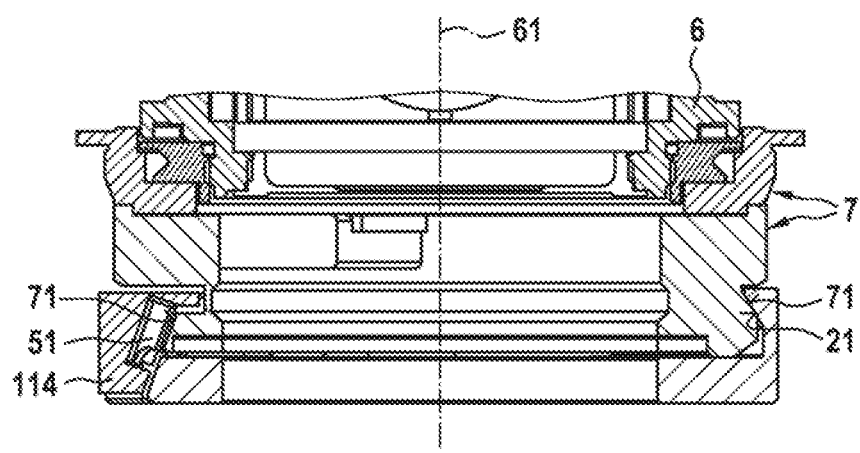
FIG. 13 shows a schematic representation of a second exemplary embodiment of a device according to the invention in a sectional representation.

In the target position, the contact surfaces 71 of the adapter 7 are guided against the adjusting surface 21 or against the adjusting surfaces 21 of the adapter receptacle 2 (FIG. 13). An adjusting surface 21 of the bar 114 designed as a slope is in contact with a likewise sloping contact surface 71.

Figure 14:
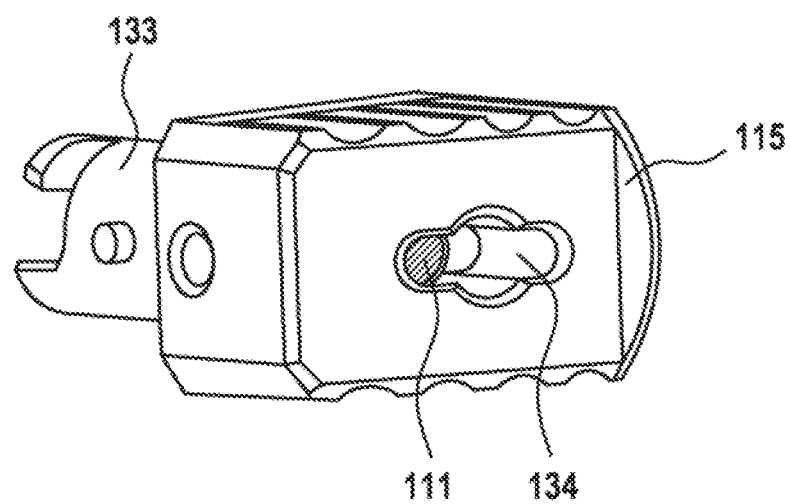
FIG. 14 shows a schematic representation of a first exemplary embodiment of a closure button.

In a further embodiment, the closure button 115 may have a keyhole 134 (FIG. 14). A key (not shown) shaped in a way corresponding to the keyhole 134, which is attached for example to an arm of a transfer machine, can be inserted into the keyhole 134 and open or close the closure button 115, for example by turning through 90°. When there is a corresponding movement of the key, the bar 114 can be carried along and pivoted by way of a carry-along magnet 111, which is optionally embedded in the closure button 115 at the base of the keyhole 134. The keyhole 134 may serve as a reference structure for the automated optical detection of a current position of the closure button 115 and/or for the detection of a current spatial position of the closed or pivoted-out bar 114, for example by means of a camera.

Figure 15:
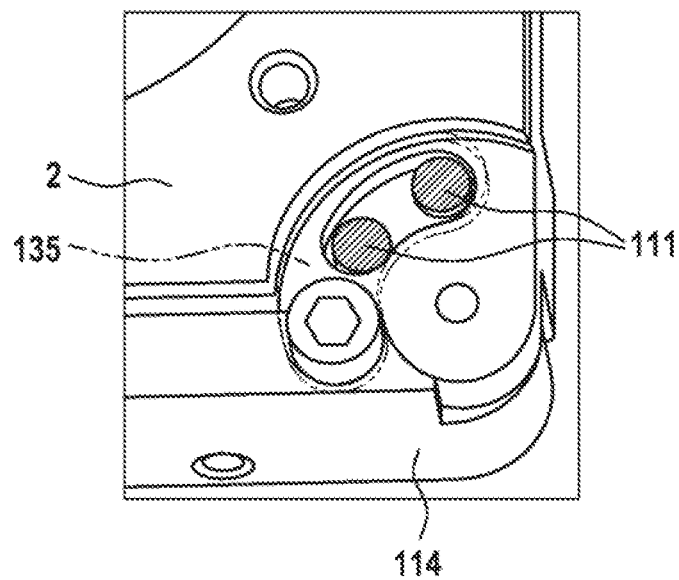
FIG. 15 shows a schematic representation of a bar and a limiter in the closed state.
Figure 16:
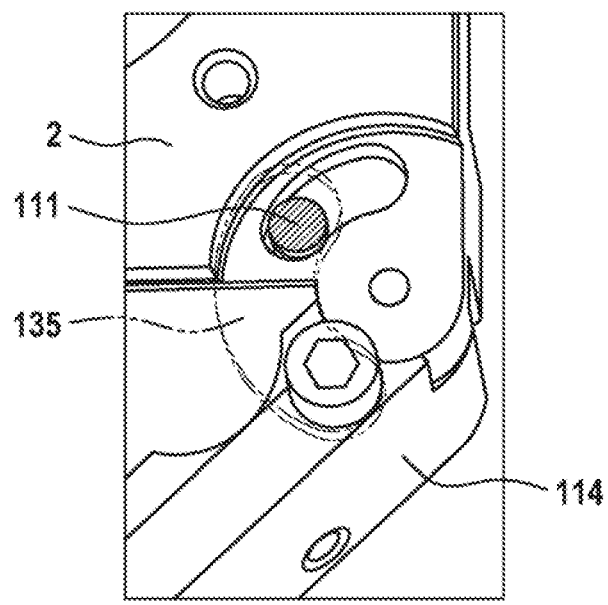
FIG. 16 shows a schematic representation of a bar and a limiter in the open state.

An exemplary embodiment of a limiting element 135 is shown in FIGS. 15 and 16. This is attached to the bar 114, for example screwed on. The limiting element 135 is delimited by interrupted solid lines and shown transparent in order to be able to show all of the elements involved and their interaction. A stop protruding from the surface of the limiting element 135, which includes a magnet 111 or is formed by a magnet 111, engages in a groove in the adapter receptacle 2 and limits the possible opening angle of the bar 114.

In the closed state of the bar 114, the magnet 111 of the limiting element 135 is located to the side of a magnet 111 arranged in the groove of the adapter receptacle 2. In the fully opened state of the bar 114, the magnets 111 of the limiting element 135 and the adapter receptacle 2 face each other in the groove and, due to their different poles facing each other, cause a magnetic holding force by which the bar 114 is kept in its open state. The magnetic holding force can be overcome again by a correspondingly great force acting on the bar 114, and the bar 114 can be pivoted and closed.

Figure 17:
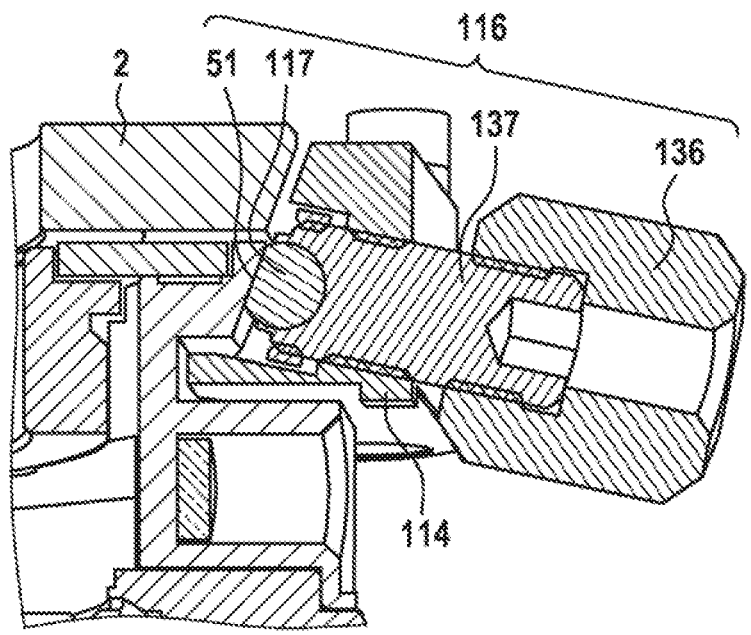
FIG. 17 shows a schematic representation of a third exemplary embodiment of a device according to the invention in a sectional representation.

Another exemplary embodiment of the adapter receptacle 2 has on the bar 114 a pressure piece 116 which has a button 136, a portion 137 with an external thread and a spherical head 117 (FIG. 17). The pressure piece 116 extends through the bar 114 in the direction of the adapter receptacle 2 or in the direction of the inserted adapter 7 and is guided in an internal thread in the bar 114. When the bar 114 is closed, the pressure piece 116, in particular the spherical head 117, can be guided against a contact surface 71 of the adapter 7 by means of turning the button 136. By means of the pressure piece 116 designed in this way, adapters 7 with very heavy objectives 6 can be picked up and brought into the target position even on upright arrangements. Advantageously, no additional spring elements are required. The adapter 7 is pushed by the pressure piece 116 into the target position and kept there. The spherical head 117 is advantageously designed as flattened and is optionally movably mounted in the portion 137. Such an embodiment has the effect that the contact pressure is evenly distributed and a flat contact of the flattening of the spherical head 117, which acts as an adjusting surface 21, is achieved. The portion 137 advantageously has radial stops, which prevent the pressure piece 116 from being completely unscrewed from the bar 114. The pressure piece 116 is therefore captive.

Figure 18:
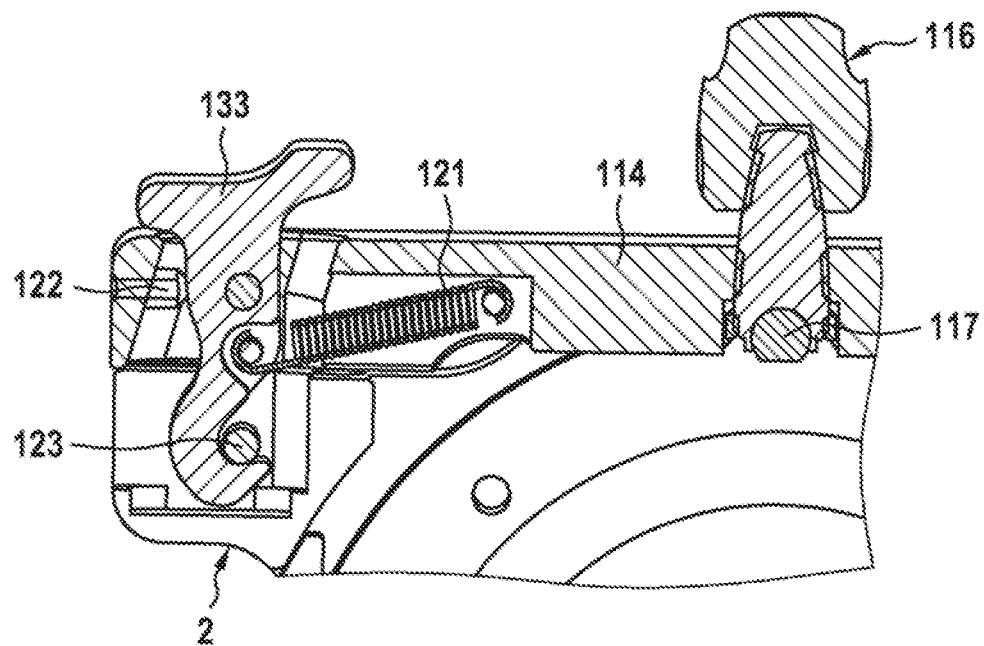
FIG. 18 shows a schematic representation of a fourth exemplary embodiment of an adapter receptacle according to the invention in a sectional representation.

The mode of operation of the pressure piece 116 is shown in (FIG. 18) in a plan view (partial section) of a further exemplary embodiment. The bar 114 can be locked in its closed state by means of a closure element 133 designed as a closure hook. The closure element 133 is loaded with a tension spring 121 and is pulled by it into a locking position. The closure hook engages behind a securing pin 123 and is limited in its possible opening angle by a limiting pin 122. The pressure piece 116 is shown in a position in which the spherical head 117 is flush with an outer contour of the bar 114.

Figure 19:
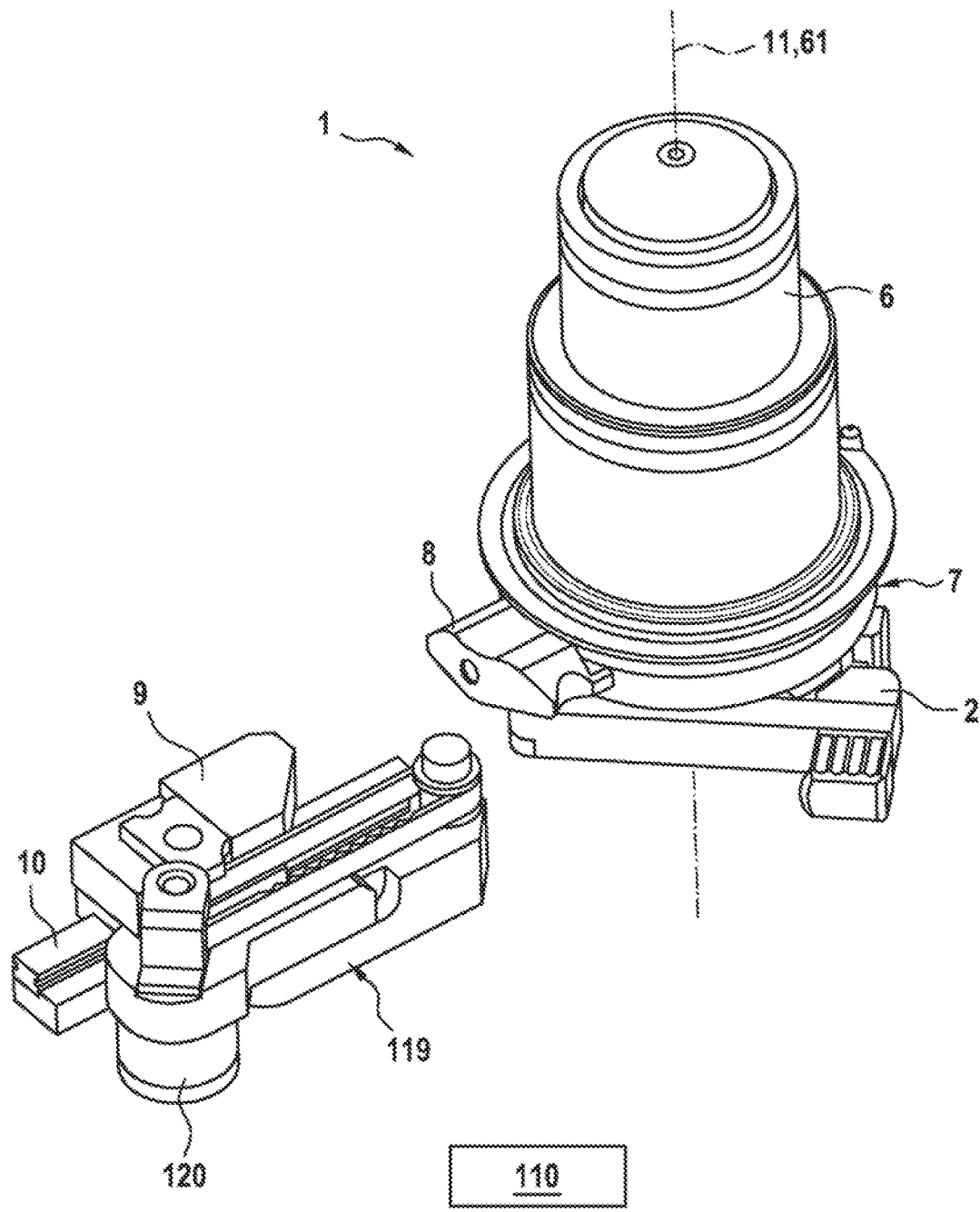
FIG. 19 shows a schematic representation of a second exemplary embodiment of an adjusting device according to the invention with an optical element in the objective axis in a perspective representation.
Figure 20:
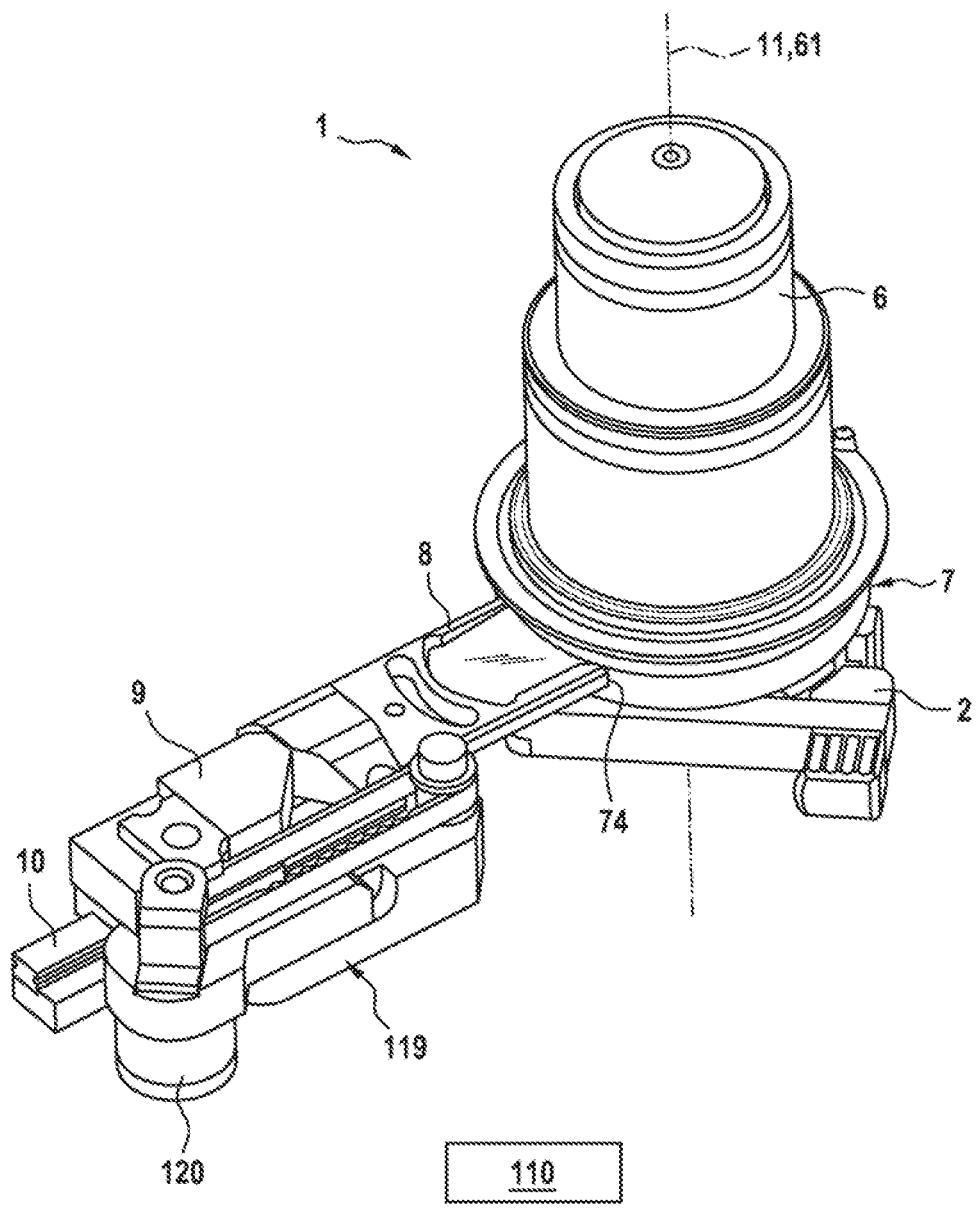
FIG. 20 shows a schematic representation of the second exemplary embodiment of an adjusting device according to the invention with an optical element out of the objective axis in a perspective representation.

In FIGS. 19 and 20, an adjusting device for moving an optical element 8 into the objective axis 61 comprising the adapter receptacle 2, the adapter 7 and a driver 119 is shown by way of example in two states.

FIG. 19 shows the optical element 8 pushed into the slot 74 (see FIGS. 2 and 4) and into the objective axis 61. The driver 119 has a slider 9, guided on a slider track 10, for coupling to the optical element 8. The optical element 8 and the slider 9 are separated from one another in the state shown of the adjusting device. The slider 9 is movable in a controlled manner by means of a drive 120. A control unit 110 is connected to the drive 120 and activates it. The objective axis 61 of the adapter 7 located in the target position and the objective 6 coincides with the optical axis 11 of the microscope system 1 not shown any more specifically.

In the state shown in FIG. 20, the slider 9 is releasably connected to the optical element 8 by means of a coupling mechanism located on the slider 9. Alternatively, instead of a coupling mechanism, on the slider 9 and/or on the optical element 8 there may be at least one magnet 111 and a coupling can take place by means of magnetic holding forces. If there is only one magnet 111 on the slider 9 or the optical element 8, the respective other technical element may be ferromagnetic or magnetizable, so that a magnetic force is produced between the optical element 8 and the slider 9 when the optical element 8 and the slider 9 move close enough to each other. The magnetic force can be used to pull the optical element 8 out of the slot 74 by means of the slider 9.

The optical element 8 has been pulled out of the beam path of the microscope 1 and is no longer penetrated by the optical axes 11, 61. A portion of the optical element 8 is still located in the slot 74. In order to use the optical element 8 for corresponding image recordings or to push the optical element 8 back into the adapter 7, so that for example the adapter 7 can be changed, the drive 120 is activated by the control unit 110 and the slider 9 is moved toward the adapter 7. Once the optical element 8 has been pushed into the adapter 7, the image recording can be performed, for example by the DIC method.

In a further possible embodiment, before a change of the adapter 7, the optical element 8 is completely removed from the slot 74 and remains on the slider 9.

Figure 21:
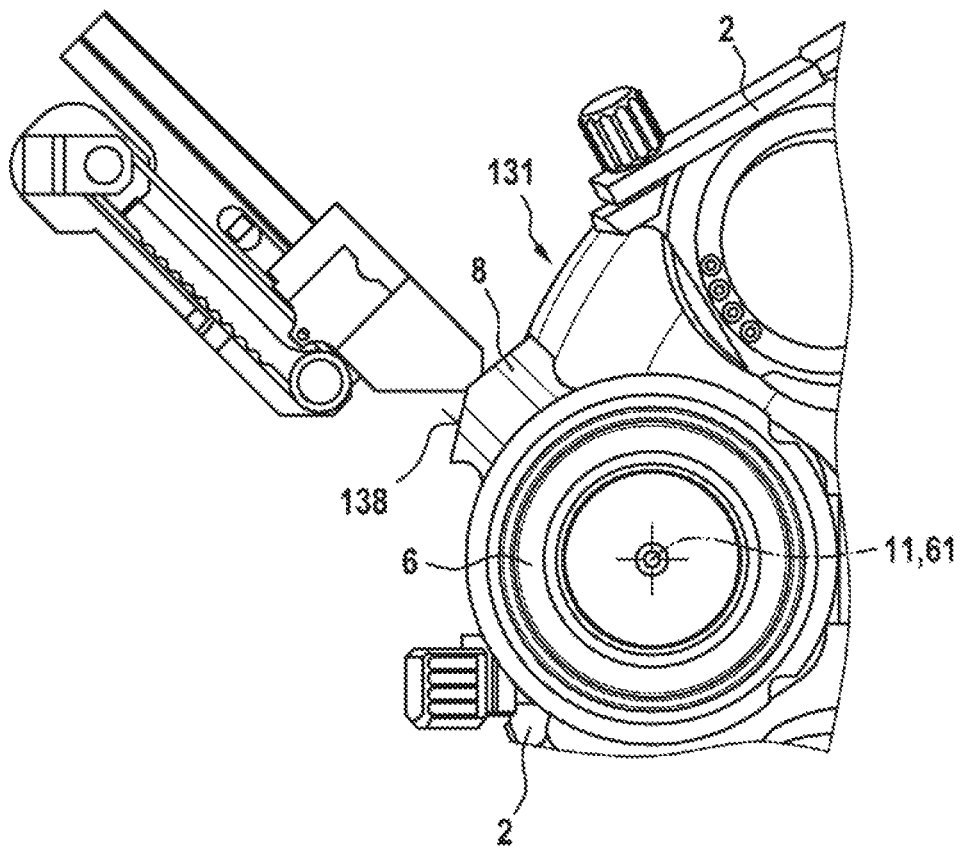
FIG. 21 shows a schematic representation of a third exemplary embodiment of an adjusting device according to the invention with a carrier in a plan view.

If the magnet 111 on the slider 9 or the optical element 8 is a permanent magnet, an exemplary embodiment of an infeeding device shown in FIG. 21 can be used. A detail of a carrier 131 in the form of a nosepiece is shown in a plan view. Several adapter receptacles 2 are attached to the carrier 131. An objective 6 is inserted in one of the adapter receptacles 2 and its objective axis 61 is infed to an optical axis 11 of the microscope system 1. The slider 9 is in contact with the optical element 8 on beveled surfaces on the end of the optical element 8 (stripping surfaces 138) protruding from the slot 74. When the carrier 131 rotates, the contact between the slider 9 and the optical element 8 is ended. Since the movement of the carrier 131 takes place essentially transversely to the magnetic connection, the optical element 8 is not pulled out of the slot 74 and the connection is "sheared off".

Figure 22:
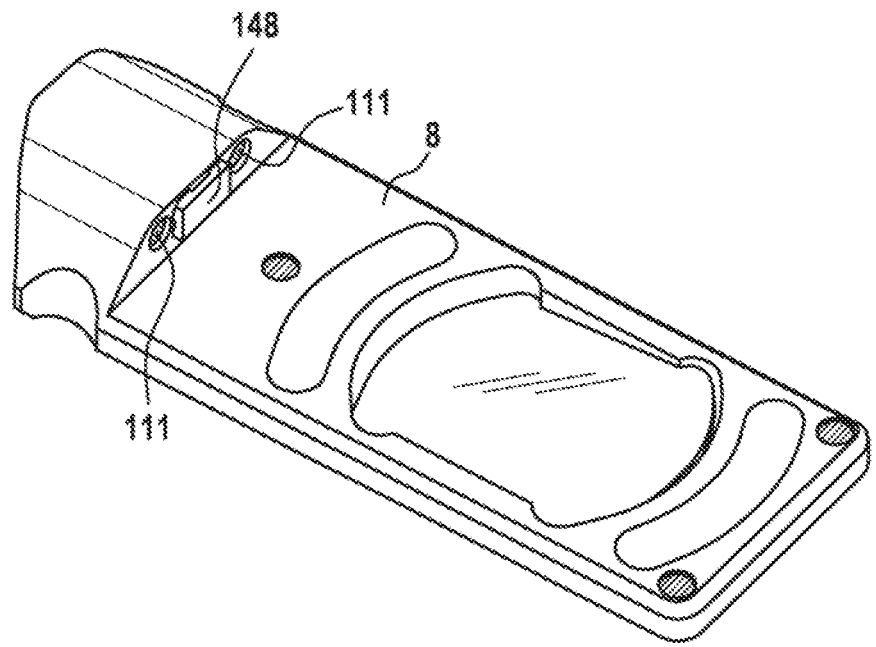
FIG. 22 shows a schematic representation of a first exemplary embodiment of an optical element in a perspective representation.

FIG. 22 shows a first exemplary embodiment of a DIC slider as a possible optical element 8. Peripheral chamfers on the frame of the optical element 8 assist entry into the slot 74. The optical element 8 has a damping element 148 made of an elastic material. In addition, there are optionally magnets 111, by the action of which the optical element 8 can be releasably connected to the adapter 7.

In order to be able to adjust the optical element 8 both by motor and manually, it is advantageous if an embodiment of the optical element 8 designed for both possibilities is used.

Figure 23:
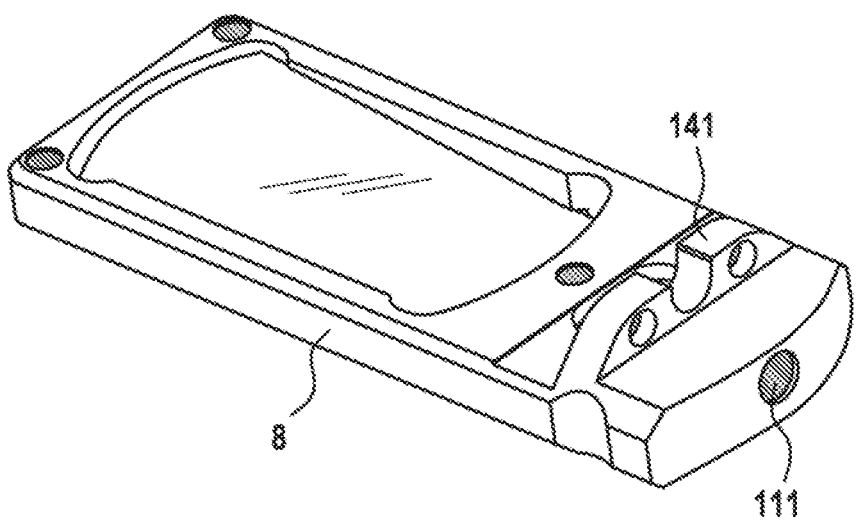
FIG. 23 shows a schematic representation of a second exemplary embodiment of an optical element in a perspective representation.
Figure 24:
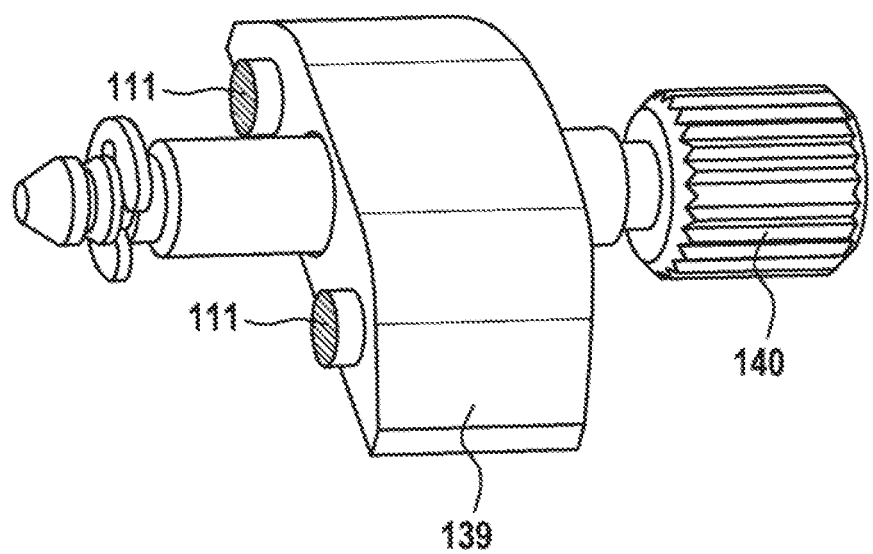
FIG. 24 shows a schematic representation of an exemplary embodiment of a removable bracket with an adjusting screw in a perspective representation.

The further exemplary embodiment of an optical element 8 shown in FIGS. 23 and 24 may be provided with a removable bracket 139 with an adjusting screw 140. The bracket 139 is provided with at least one magnet 111.

On the optical element 8 there is a receiving surface for the bracket 139 and also a raised edge 141. Incorporated in the raised edge 141 are bores with magnets 111 inserted therein. The bracket 139 with the adjusting screw 140 can be placed on the receiving surface if necessary. The magnets 111 of the bracket 139 thereby engage in the bore of the raised edge 141. The bracket 139 is held on the receiving surface by the action of the magnetic holding force of the magnets 111 of the bracket 139 and the raised edge 141.

Figure 25:
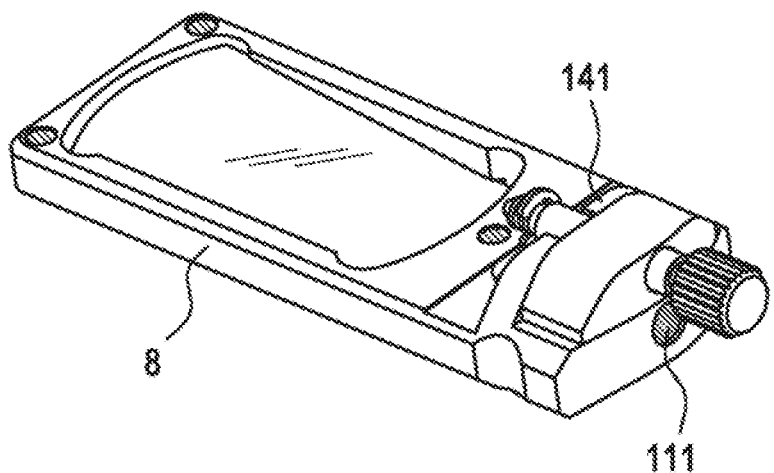
FIG. 25 shows a schematic representation of the first exemplary embodiment of an optical element with an attached bracket and an adjusting screw in a perspective representation.

With the bracket 139 attached, the optical element 8 can be adjusted manually by means of the adjusting screw 140 (FIG. 25). If the optical element 8 is to be used in an automated manner, in particular motor-driven, the bracket 139 is removed by the adjusting screw 140 (FIG. 23).

Figure 26:
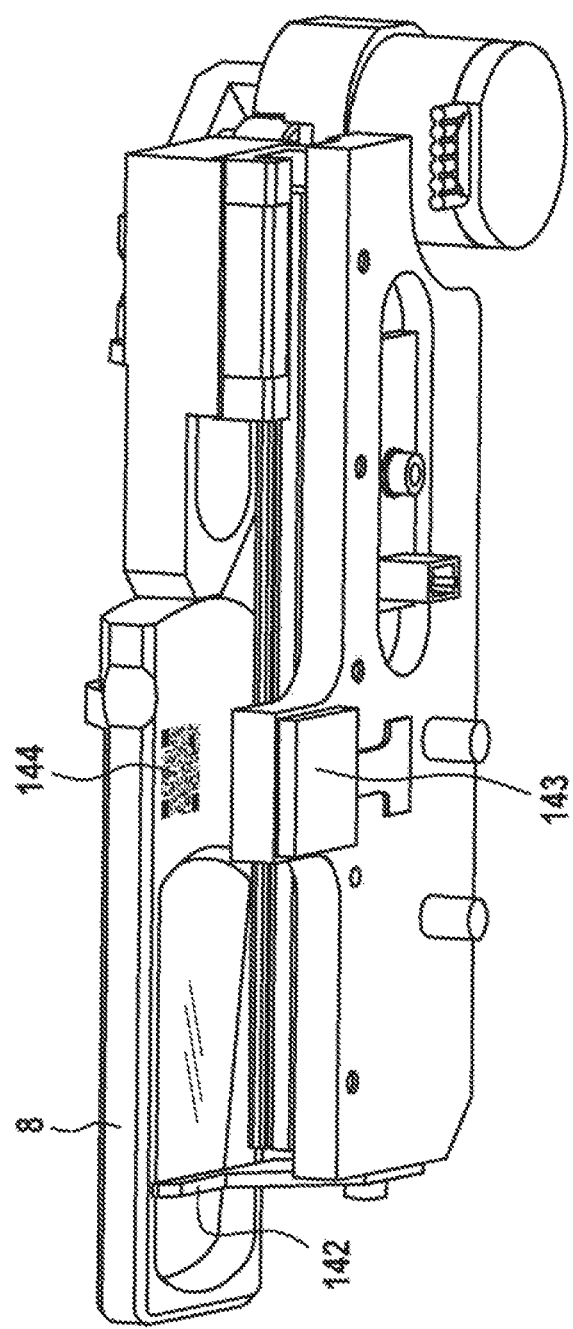
FIG. 26 shows a schematic representation of an exemplary embodiment of a driver of a perspective representation.

In an exemplary embodiment of a driver, the slider track 10 (see for example FIG. 20) can be provided with transversely arranged webs 142, on which the optical element 8 rests with its frame and which act as a tilt protection. FIG. 26 shows such an exemplary embodiment of a driver with a camera 143. The camera 143 is placed in such a way that a mark or a coding 144, for example a QR code, can be detected when the optical element 8 is for example in an end position. This end position, which can also be used as a reference position, is reached for example when the optical element 8 is fully extended out of the slot 74. It can thus be detected whether an optical element 8 is present and what it is.

Figure 27:
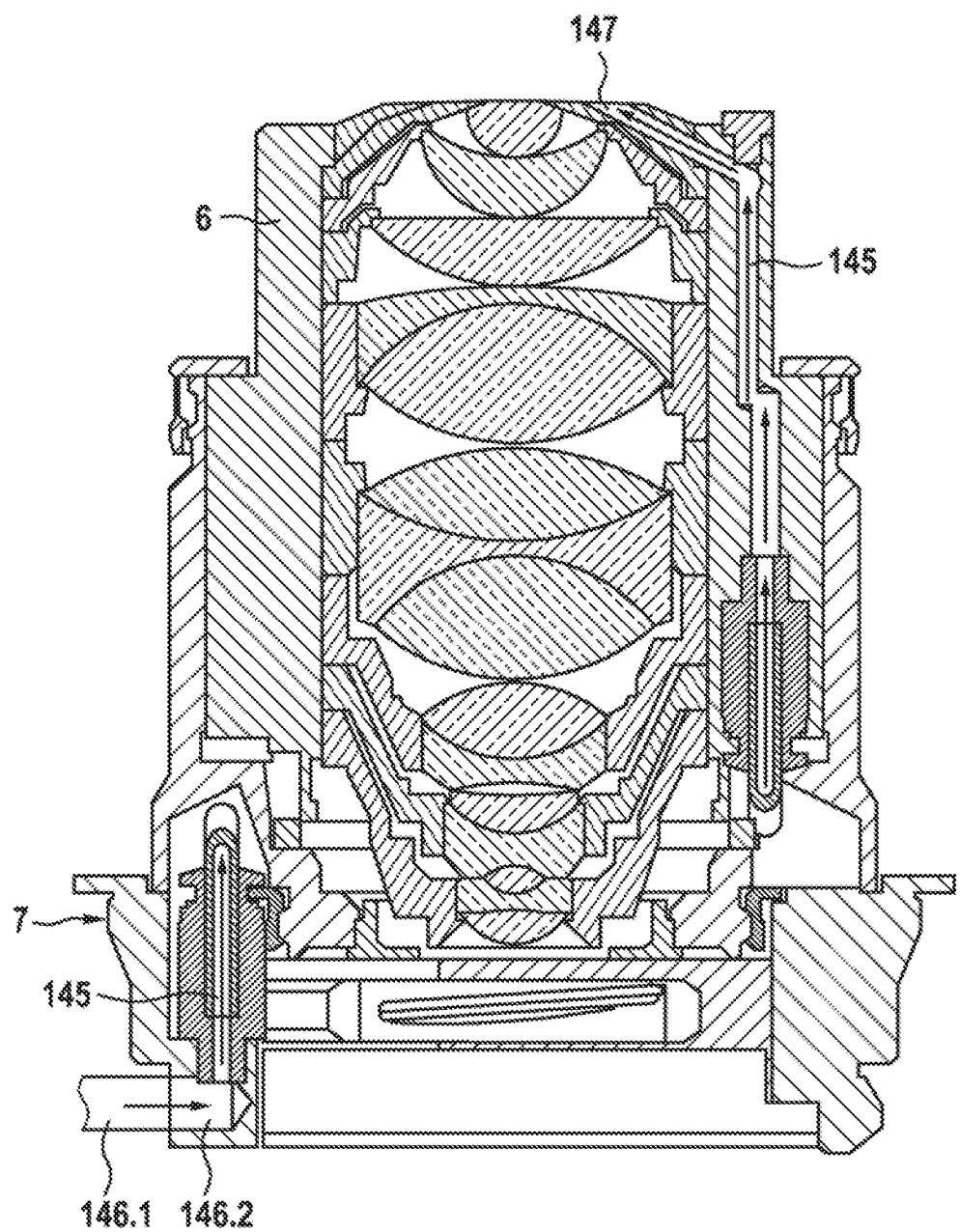
FIG. 27 shows a schematic representation of a first exemplary embodiment of a device according to the invention with a media feed in a sectional representation.

FIG. 27 shows a basic structure of a media line 145 led through the adapter 7 and the objective 6. A first channel 146.1 present in the adapter receptacle 2 (not shown) is attached to a second channel 146.2, which is formed in or on the adapter 7. The connection point of the first channel 146.1 and the second channel 146.2 functions as a media transfer opening. In the exemplary embodiment, the media line 145 leads through the adapter 7 and opens out in the area of the collar 73. From there, a medium passes through a further media line 145, which is formed in the objective 6, for example in its outer sleeve, to a front lens, where the medium reaches the front lens through an opening 147 of the media line 145. In the exemplary embodiment, the media line 145 is led in a semicircle around the inner area of the objective 6, and therefore only portions thereof are visible.

In further embodiments, the first channel 146.1 may also be formed on a media feed that is not part of the adapter receptacle 2. The media feed may be present for example on the driver 119. The media lines 145 may be realized as bores and/or grooves. These must be sealed at the transition points and openings to the outside.

Figure 28:
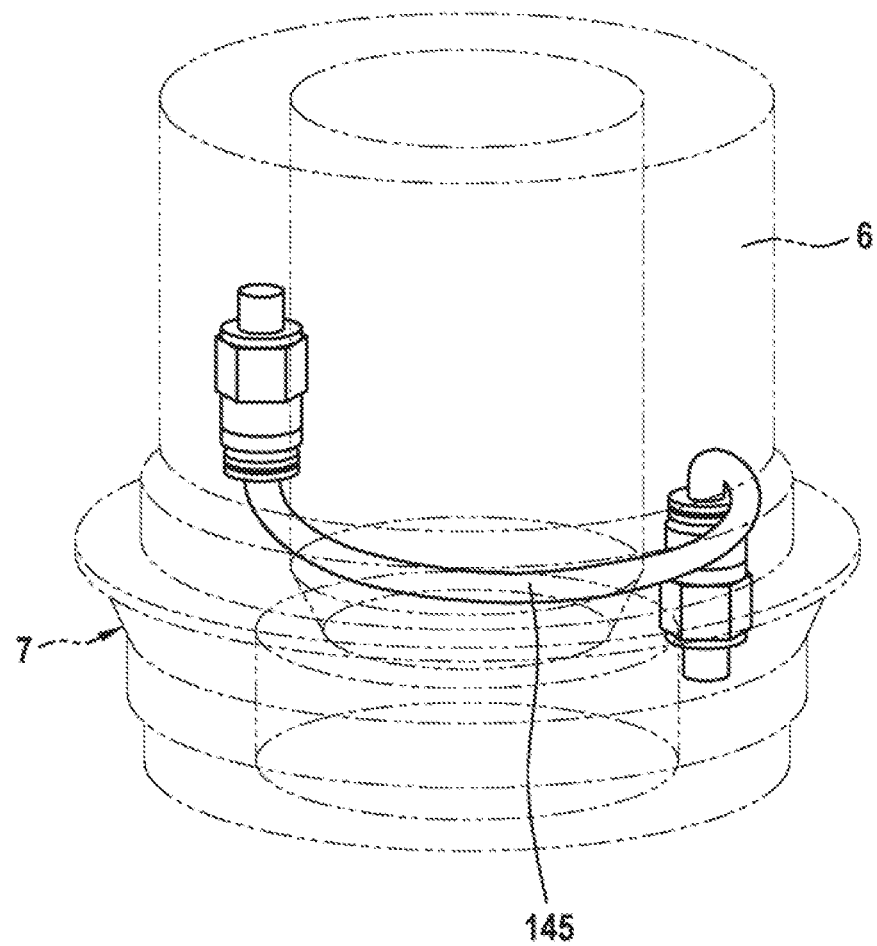
FIG. 28 shows a schematic representation of a second exemplary embodiment of a device according to the invention with a media feed in a basic representation.

FIG. 28 shows a technical solution for the media feed-through for an objective 6 with a sample protector, which for example compresses when it comes into contact with the sample. The spring travel can be compensated for by an elastic hose element laid around the core of the objective 6 as a media line 145, as is shown schematically. Alternatively, the resilient area can also be sealed by means of O-rings.

The transition point between the adapter 7, the adapter receptacle 2 and/or the carrier 131 is designed in such a way that a connection of the first and second channels 146.1, 146.2 (see FIG. 27) is carried out either by the movement in the direction of the optical axis 61 when lifting off of the objective 6 occurs or perpendicularly to the optical axis 61 when gripping/clamping of the objective 6 occurs.

It is important to ensure here that the media transfer opening is sealed against leakage of the medium. This can be realized for example by a membrane in the objective 6 which has a hole in the middle through which a media line 145 is pushed or can be pushed. For this purpose, the media line 145 may be a piece of pipe which is fixedly attached to the carrier 131. Alternatively, a slotted membrane with appropriate rigidity can also be used here.

Again as an alternative, an O-ring may be inserted into the media transfer opening as a seal. It should be noted here that, as far as possible, the entire medium is removed by suction before the adapter 7 is changed, so that contamination, corrosion and possibly short circuits occur.

Figure 29:
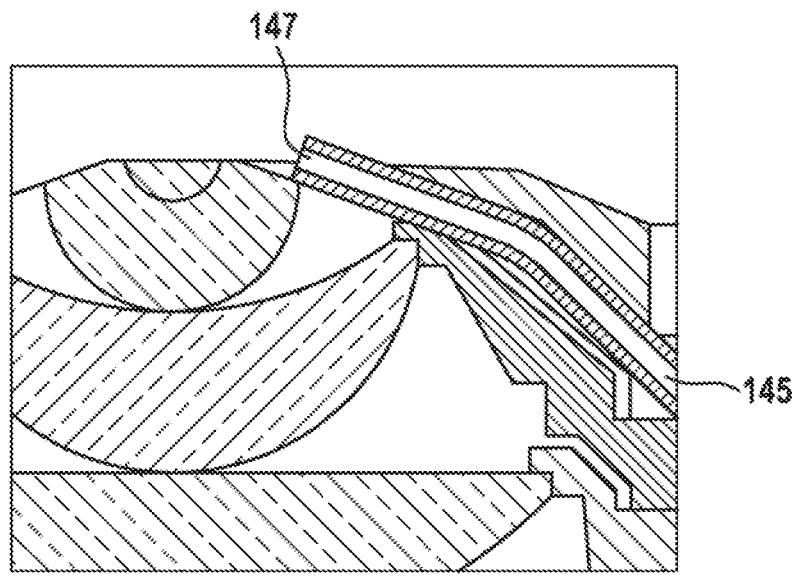
FIG. 29 shows a schematic representation of a first exemplary embodiment of a media feed on a front lens of an objective in a sectional representation and FIG. 30 shows a schematic representation of a second exemplary embodiment of the media feed on the front lens of the objective in a sectional representation.
Figure 30:
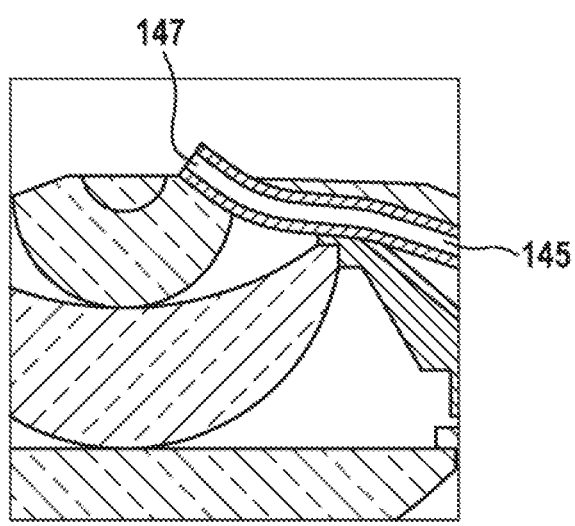

As an alternative to the media feed-through by means of bores and sealed grooves in the parts of the objective, a feed-through via plastic hoses or pipelines is possible. These are laid directly up to the front lens through a groove or bore in the front lens mount (FIG. 29). They may also be led through a groove in the front lens if this groove does not impair the optical beam path (FIG. 30).

The media line 145 may have at the opening 147 a nozzle (not shown), which advantageously distributes the medium on the front lens.

The advantage of using a hose or pipeline is that it can be replaced if this line is soiled by particles, for example from the medium itself or from abrasion of the parts through which the flow passes.

REFERENCE SIGNS

1 Microscope system
11 Optical axis of the microscope system
2 Adapter receptacle
21 Adjusting surface
3 Receiving area
4 Holding structure
5 Threaded insert
6 Objective
61 Objective axis
7 Adapter
71 Contact surface
72 Guiding surface
73 Collar (of the adapter 7)
74 Slot
75 Base
8 Optical element
9 Slider
10 Slider track
110 Control unit
111 Magnet
112 Bolt
113 Contact element
114 Bar
115 Closure button
116 Pressure piece/spring
117 Flattened spherical head
118 Toric mirror
119 Driver
120 Drive (of the slider 9)
121 Tension spring
122 Limiting pin
123 Securing pin
124 Transporting opening
125 Illumination unit
125.1 Lights
126 Fitting piece
127.1 Threaded pin
127.2 Threaded pin
128 Indentation
129 Centering pin
130 Structural element
131 Carrier/nosepiece
132 Base plate
133 Closure element
134 Keyhole
135 Limiting element
136 Button
137 Portion 138 Stripping surface
139 Bracket
140 Adjusting screw
141 Raised edge
142 Web
143 Camera
144 Mark/coding
145 Media line
146.1 First channel
146.2 Second channel/media transfer opening
147 Opening
148 Damping element

The invention claimed is:

1. An adapter for connection to an objective, the adapter comprising:
a receiving area for receiving the objective,
a plurality of adjusters adjacent to the receiving area; and
at least one holding structure which extends essentially in a plane directed transversely to an objective axis of the objective and having a side surface which is designed to engage at least one corresponding structural element of an adapter receptacle while the adapter is being inserted into the adapter receptacle, the side surface of the at least one holding structure, when engaged, preventing the adapter from already moving in a direction of the objective axis when in an upright orientation and when in an inverted orientation while the adapter is being inserted into the adapter receptacle, and wherein the plurality of adjusters are configured to move the adapter transversely in the plane to align the objective axis of the objective with an optical axis of a microscope system, wherein the adapter further comprises:
a plurality of contacts; and
a plurality of lights electrically connected to the plurality of contacts,
wherein the plurality of contacts and the plurality of lights are arranged in a circular pattern having a center which coincides with the objective axis.

2. The adapter as claimed in claim 1, wherein the at least one holding structure is designed in each case as an opening, groove, pin or projection.

3. The adapter as claimed in claim 1, further comprising a slot for receiving an optical element that can be moved into the objective axis.

4. The adapter as claimed in claim 3, further comprising at least one magnet arranged in the slot.

5. The adapter as claimed in claim 3, further comprising at least one damping element on an optical element configured to be arranged in the slot.

6. The adapter of claim 1, further comprising:
at least one element selected from the group consisting of a magnet embedded in a base of the adapter, a threaded pin, and a centering pin.

7. The adapter as claimed in claim 1, wherein the adapter includes a slot configured to receive an optical element, the optical element extending into the adapter through the slot, with the objective axis passing through the optical element.

8. A system, comprising:
an adapter receptacle for receiving the adapter, and
the adapter as claimed in claim 1,
wherein the adapter receptacle comprises at least one adjusting surface, against which a contact surface of the adapter is guided and is brought into contact with it in a target position,
wherein the adapter receptacle further comprises at least one structural element which corresponds to the at least one holding structure of the adapter extending in a plane directed transversely to the objective axis and which comes into engagement with the at least one holding structure while the adapter is being inserted into the adapter receptacle, so that the adapter is prevented from already moving in the direction of the objective axis while the adapter is being inserted into the adapter receptacle and
a pivotable or insertable bar of the adapter receptacle for keeping the adapter in the target position.

9. The system as claimed in claim 8, wherein the bar is provided with a pressure piece, which in a closed state of the bar is guided against the adapter without play.

10. The system as claimed in claim 8, wherein the bar is provided with at least one magnet.

11. The system as claimed in claim 8, wherein the adapter receptacle comprises a first channel and the adapter comprises a second channel herein an opening of the first channel and of the second channel are in contact with one another when the adapter is in the target position, so that a medium can be passed through the channels that are connected in this way.

12. The system of claim 8, wherein the adapter receptacle comprises at least one bolt, the adapter comprises at least one indentation, and the at least one bolt is configured to engage into the at least one indentation.

* * * * *